(No Model.)
B. C. CROSS.
DRAIN PIPE.
No. 258,222. Patented May 23, 1882.
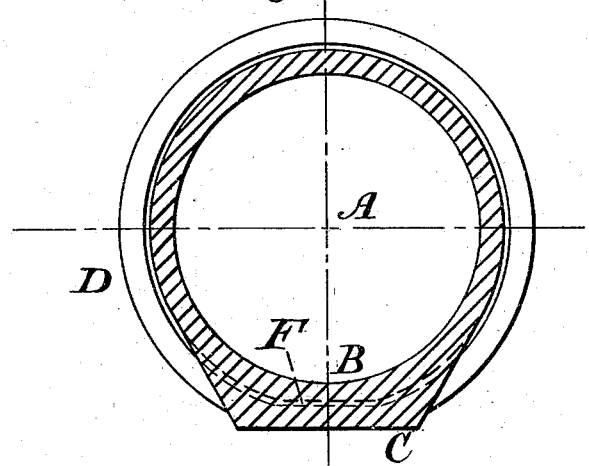
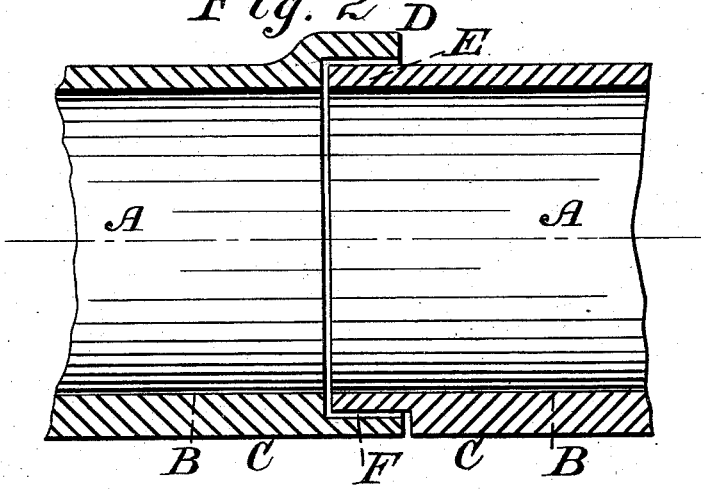
Witnesses:
H. E. Davis.
G. Johnson.
Inventor.
Benjamin Crocker Cross
by John J. Halsted & Son
Attys.

UNITED STATES PATENT OFFICE.

BENJAMIN C. CROSS, OF DEWSBURY, COUNTY OF YORK, ENGLAND.

DRAIN-PIPE.

SPECIFICATION forming part of Letters Patent No. 258,222, dated May 23, 1882.

Application filed October 7, 1881. (No model.) Patented in England February 26, 1881, No. 822.

*To all whom it may concern:*

Be it known that I, BENJAMIN CROCKER CROSS, a subject of the Queen of Great Britain, of Dewsbury, in the county of York, England, have invented new and useful Improvements in Drain-Pipes, (for which I have obtained a patent in Great Britain, No. 822, bearing date February 26, 1881,) of which the following is a specification.

My invention relates to drain-pipes made in suitable lengths and jointed together; and the objects of my improvement are, first, to provide a perfectly even and flat bed at the bottom of the pipes; second, to secure that the invert or lower edge of the internal bore of the pipes shall be perfectly even; and, third, to increase the resistance to wear and tear by extra thickness of material at the invert.

The accompanying drawings are in illustration of the method in which I attain these objects.

Figure 1 is a cross-section of pipe, showing a front elevation of the socket. Fig. 2 is a longitudinal section of parts of two adjoining pipes jointed together.

Similar letters refer to similar parts in both views.

A is the bore of the pipes, B being the invert or lower edge. It will be seen that the lower parts of the pipes outside are made flat at C, and are of greater thickness than the sides and crown, so as to allow additional wear and tear upon the invert at B.

D is the outer socket, into which the end E of the adjoining pipe fits, both the socket D and the end E which enters it being made flat at their lower side, as shown at F.

Pipes constructed according to my invention are stronger than ordinary socket-pipes, the weight being distributed over the whole of the pipes, and not mainly on the sockets, as at present. They are not liable to be displaced by walking upon them or filling in round them. They are more easily laid, as the bed upon which they lie can be made perfectly even to the required levels, the pipes being then laid on the bed and pushed one into another, no lifting of either pipe being necessary. A tight joint can be easily made by putting a little cement on and about the bottom of the socket of a pipe and forcing the end of adjoining pipe into same, and the invert being thus made perfectly tight, the rest of the joint can be easily made by hand. They are very durable on account of the extra thickness of the invert at D, where the principal wear and tear occurs. The pipes may be made in metal, fire-clay, stoneware, concrete, or other suitable material.

Having fully described my invention, what I desire to claim and secure by Letters Patent is—

1. The socket D, having a flat bottom, in combination with the corresponding end of the pipe E, which also has a flat bottom, so as to form at F a flat part of the joint between the pipes, substantially as set forth and shown.

2. The pipe C, having a flat bottom which is of a thickness greater than the rest of the pipe, substantially as set forth and shown.

In testimony whereof I have signed my name to this specification in the presence of two subscribing witnesses.

BENJAMIN CROCKER CROSS.

Witnesses:
A. V. DOCKERY,
WILLIAM WARD.